United States Patent
Yan et al.

(10) Patent No.: US 8,650,340 B2
(45) Date of Patent: Feb. 11, 2014

(54) MULTI-CORE QUERY PROCESSING USING ASYNCHRONOUS BUFFERS

(75) Inventors: Jianfeng Yan, Shanghai (CN); Wen-Syan Li, Shanghai (CN)

(73) Assignee: SAP AG, Walldorf (DE)

( * ) Notice: Subject to any disclaimer, the term of this patent is extended or adjusted under 35 U.S.C. 154(b) by 188 days.

(21) Appl. No.: 12/831,795

(22) Filed: Jul. 7, 2010

(65) Prior Publication Data

US 2011/0314233 A1    Dec. 22, 2011

(51) Int. Cl.
*G06F 3/00* (2006.01)
*G06F 5/00* (2006.01)

(52) U.S. Cl.
USPC .......................................................... 710/39

(58) Field of Classification Search
None
See application file for complete search history.

(56) References Cited

U.S. PATENT DOCUMENTS

| | | | | |
|---|---|---|---|---|
| 5,758,149 | A * | 5/1998 | Bierma et al. | 1/1 |
| 6,598,078 | B1 * | 7/2003 | Ehrlich et al. | 709/224 |
| 2004/0010499 | A1 * | 1/2004 | Ghosh et al. | 707/100 |
| 2005/0050552 | A1 | 3/2005 | Fuller | |
| 2007/0008983 | A1 | 1/2007 | Van Doren et al. | |
| 2008/0168234 | A1 * | 7/2008 | Gill et al. | 711/134 |
| 2010/0115142 | A1 * | 5/2010 | Lim | 710/5 |

OTHER PUBLICATIONS

Boncz, et al., "Beyond Cache-Conscious Query Processing", retrieved from: http://homepages.cwi.nl/~boncz/x100.html on May 2, 2010, 4 pages.

Boncz, et al., "Breaking the Memory Wall in MonetDB", Communications of the ACM, vol. 51, Issue 12, Dec. 2008, pp. 77-85.
Boncz, et al., "Database Architecture Optimized for the New Bottleneck: Memory Access", Proceedings of the 25th International Conference on Very Large Data Bases, 1999, 12 pages.
Boncz, et al., "Monet: An impressionist sketch of an advanced database system", in Proceedings IEEE Basque International Workshop on Information Technology, Nov. 1994, 13 pages.
Boncz, "Template for Definitional Entry: Main Memory", Centrum voor Wiskunde en Informatica (CWI), May 14, 2010, 2 pages.
Boncz, "Template for Definitional Entry: Processor Cache", Centrum voor Wiskunde en Informatica (CWI), May 14, 2010, 2 pages.
Cieslewicz, et al., "Parallel Buffers for Chip Multiprocessors", Proceedings on the Third International Workshop on Data Management on New Hardware, Jun. 15, 2007, 10 pages.
Extended EP Search Report for EP Application No. 11005523.3, mailed Dec. 8, 2011, 6 pages.

(Continued)

*Primary Examiner* — Henry Tsai
*Assistant Examiner* — Aurangzeb Hassan
(74) *Attorney, Agent, or Firm* — Brake Hughes Bellermann LLP

(57) ABSTRACT

A system may include a buffer monitor configured to monitor buffer content of a buffer being used during processing of a query workflow in which write tasks of the query workflow write data to the buffer and read tasks of the query workflow read data from the buffer, the buffer having a buffer capacity. The system may include a threshold manager configured to compare the buffer content to a low threshold and to a high threshold that are defined relative to the buffer capacity, and a speed controller configured to control a number of the write tasks relative to a number of the read tasks that are currently executing the query workflow, to thereby maintain the buffer content between the low threshold and the high threshold.

20 Claims, 7 Drawing Sheets

(56) References Cited

OTHER PUBLICATIONS

Kader, "ROX: The Robustness of a Run-Time XQuery Optimizer Against Correlated Data", Proceedings of the 26th International Conference on Data Engineering, 2010, 4 pages.
Karayannidis, et al, "Hierarchical clustering for OLAP: the CUBE File approach", The International Journal on Very Large Data Bases, vol. 17, Issue 4, 2008, pp. 621-655.
Manegold, et al, "Database Architecture Evolution: Mammals Flourished long before Dinosaurs became Extinct", Proceedings of the VLDB Endowment, vol. 2 , Issue 2, 2009, 6 pages.
Manegold, et al., "Optimizing database architecture for the new bottleneck: memory access", The International Journal on Very Large Data Bases, vol. 9, Issue 3, 2000, pp. 231-246.
Manegold, "Understanding, Modeling, and Improving Main-Memory Database Performance", Doctoral Thesis, 2002, 176 pages.
Qiao, et al, "Main-Memory Scan Sharing for Multi-Core CPUs", Proceedings of the VLDB Endowment, vol. 1, Issue 1, 2008, pp. 610-621.
Rao et al., "Automating physical database design in a parallel database", Proceedings of the ACM SIGMOD international conference on Management of data, 2002, pp. 558-569.
Sidirourgos, et al., "Generic and updatable XML value indices covering equality and range lookups", CWI. Information Systems [INS], No. E0802, Dec. 2008, 3 pages.
Sidirourgos, et al., "Generic and updatable XML value indices covering equality and range lookups". Workshop on Database Technologies for Handling XML Information on the Web, 2009, 8 pages.
Tam, et al., "Thread Clustering: Sharing-Aware Scheduling on SMP-CMP-SMT Multiprocessors", Proceedings of the 2nd ACM SIGOPS/EuroSys European Conference on Computer Systems, 2007, pp. 47-58.
Tang, et al., "Materialized View Selection in XML Databases", Proceedings of the 14th International Conference on Database Systems for Advanced Applications, 2009, 16 pages.
Zhang, "Towards P2P XML Database Technology", VLDB Endowment, Sep. 23-28, 2007, 6 pages.
Zukowski, et al., "DSM vs. NSM: CPU performance tradeoffs in block-oriented query processing", Proceedings of the 4th international workshop on Data management on new hardware, 2008, pp. 47-54.

\* cited by examiner

MULTI-CORE QUERY PROCESSING USING ASYNCHRONOUS BUFFERS

CROSS-REFERENCE TO RELATED APPLICATION

This application claims priority under 35 U.S.C. §119 to Chinese Patent Application 201010205721.8, filed Jun. 22, 2010, titled "MULTI-CORE QUERY PROCESSING USING ASYNCHRONOUS BUFFERS," which is incorporated herein by reference in its entirety.

TECHNICAL FIELD

This description relates to multi-core query processing using asynchronous buffers.

BACKGROUND

Data-intensive computing operations may be executed in a fast and efficient manner by using a plurality of processing cores to execute the computing operations in a parallel or overlapping fashion. For example, a query may be executed against a relational database, and each of a pair of processing cores may be used to search half of the relational database to thereby obtain a query result for the database as a whole. More generally, any number of available cores may be used in parallel by defining sub-portions of the computing operation(s) and assigning one or more of the cores to each one of the sub-portions. The sub-portions may be defined, e.g., by partitioning data to be queried, and/or by defining individual sub-tasks of the overall computing operation(s).

Thus, in certain types of computing operations, it may be necessary or advantageous to execute or otherwise process a query by defining sub-tasks of the query, so that each sub-task of the query has an intermediate input and output, while the final sub-task(s) outputs the final query result. In such cases, it may often occur that a quantity and/or type of data being queried, and/or of desired query result(s), may benefit from storing the intermediate outputs within buffers during the query processing. For example, for very large quantities of data, it may be impractical or impossible to move the data from one storage location to another within a desired time frame. Consequently, instead, a query sub-task may write intermediate results as output to a buffer, and a subsequent query sub-task may read the intermediate results as input from the buffer. In this way, the intermediate data may stay within the buffer during processing.

Problematically, it may occur that the intermediate results are written to such a buffer faster (or slower) than the intermediate results may be read therefrom. In such cases, the buffer may, over time, become completely full or completely empty. In such cases, cores dedicated to related processing may become idle, and/or may be switched from writing to the buffer to reading therefrom (or vice-versa). However, occurrences either of idle cores and/or of excessive switching of cores between query sub-tasks are generally associated with inefficiencies in the query processing, and with a reduced speed of obtaining a final query result.

SUMMARY

According to one general aspect, a system may include instructions recorded on a computer-readable medium that are executable by at least one processor, the system comprising a buffer monitor configured to cause the at least one processor to monitor buffer content of a buffer being used during processing of a query workflow in which write tasks of the query workflow write data to the buffer and read tasks of the query workflow read data from the buffer, the buffer having a buffer capacity, a threshold manager configured to cause the at least one processor to compare the buffer content to a low threshold and to a high threshold that are defined relative to the buffer capacity, and a speed controller configured to cause the at least one processor to control a number of the write tasks relative to a number of the read tasks that are currently executing the query workflow, to thereby maintain the buffer content between the low threshold and the high threshold.

Implementations may include one or more of the following features. For example, the buffer monitor may be configured to cause the at least one processor to count a number of filled memory blocks relative to a number of empty memory blocks within the buffer.

The threshold manager may include a threshold comparator configured to cause the at least one processor to determine whether the buffer content is lower than the low threshold or higher than the high threshold. The threshold manager may include a threshold adjuster configured to cause the at least one processor to adjust the high and low thresholds relative to a number of the write tasks and/or a number of the read tasks, and relative to a number of empty and/or filled memory blocks of the buffer.

The speed controller may be configured to cause a workload manager to cause the at least one processor to control the number of write tasks relative to the number of read tasks by reassigning processing cores processing the write tasks and the read tasks. The speed controller may be configured to cause the workload manager to cause the at least one processor to assign processing cores from at least one write task, to thereby deactivate the at least one write task, to at least one read task, to thereby activate the at least one read task, when the buffer content is above the high threshold. The speed controller may be configured to cause the workload manager to cause the at least one processor to assign processing cores from at least one read task, to thereby deactivate the at least one read task, to at least one write task, to thereby activate the at least one write task, when the buffer content is below the low threshold.

A workload manager may be configured to cause the at least one processor to associate available processing cores among a plurality of buffers, and associated write and read tasks thereof, of the query workflow. The query workflow may include at least one sequence of buffers and wherein the workload manager may be configured to cause the at least one processor to implement a pipeline encouraged mode including assigning processing cores from the available processing cores to at least one task associated with each buffer of the at least one sequence of buffers. The query workflow may include at least one sequence of buffers and the workload manager may be configured to cause the at least one processor to implement a locale encouraged mode including assigning processing cores from the available processing cores to tasks of a first selected buffer of the sequence of buffers until a maximum number of cores is reached for implementing the tasks of the first selected buffer, and then assigning remaining processor cores from the available processing cores to tasks of a second selected buffer of the sequence of buffers.

The query workflow may be expressed as a directed acyclic graph in which the buffer is one of a plurality of buffers and the write task and the read task are included in a plurality of tasks, and wherein the plurality of buffers and the plurality of tasks are nodes of the directed acyclic graph.

According to another general aspect, a method implemented by at least one processor may include monitoring, using the at least one processor, buffer content of a buffer being used during processing of a query workflow in which write tasks of the query workflow write data to the buffer and read tasks of the query workflow read data from the buffer, the buffer having a buffer capacity. The method may further include comparing, using the at least one processor, the buffer content to a low threshold and to a high threshold that are defined relative to the buffer capacity, and controlling, using the at least one processor, a number of the write tasks relative to a number of the read tasks that are currently executing the query workflow, to thereby maintain the buffer content between the low threshold and the high threshold.

Implementations may include one or more of the following features. For example, the comparing may include determining whether the buffer content is lower than the low threshold or higher than the high threshold.

The method may include adjusting the high and low thresholds relative to a number of the write tasks and/or a number of the read tasks, and relative to a number of empty and/or filled memory blocks of the buffer.

The controlling may include controlling the number of write tasks relative to the number of read tasks by reassigning processing cores processing the write tasks and the read tasks.

The method may include associating available processing cores among a plurality of buffers, and associated write and read tasks thereof, of the query workflow.

According to another general aspect, a computer program product may be tangibly embodied on a computer-readable storage medium and may include instructions that, when executed, are configured to cause at least one processor to monitor buffer content of a buffer being used during processing of a query workflow in which write tasks of the query workflow write data to the buffer and read tasks of the query workflow read data from the buffer, the buffer having a buffer capacity, compare the buffer content to a low threshold and to a high threshold that are defined relative to the buffer capacity, and control a number of the write tasks relative to a number of the read tasks that are currently executing the query workflow, to thereby maintain the buffer content between the low threshold and the high threshold.

Implementations may include one or more of the following features. For example, the instructions, when executed, may cause the at least one processor to compare the buffer content including determining whether the buffer content is lower than the low threshold or higher than the high threshold.

The instructions, when executed, may cause the at least one processor to control the number of write tasks relative to the number of read tasks by reassigning processing cores processing the write tasks and the read tasks. The instructions, when executed, may further cause the at least one processor to associate available processing cores among a plurality of buffers, and associated write and read tasks thereof, of the query workflow.

The details of one or more implementations are set forth in the accompanying drawings and the description below. Other features will be apparent from the description and drawings, and from the claims.

DETAILED DESCRIPTION

Figure 1:
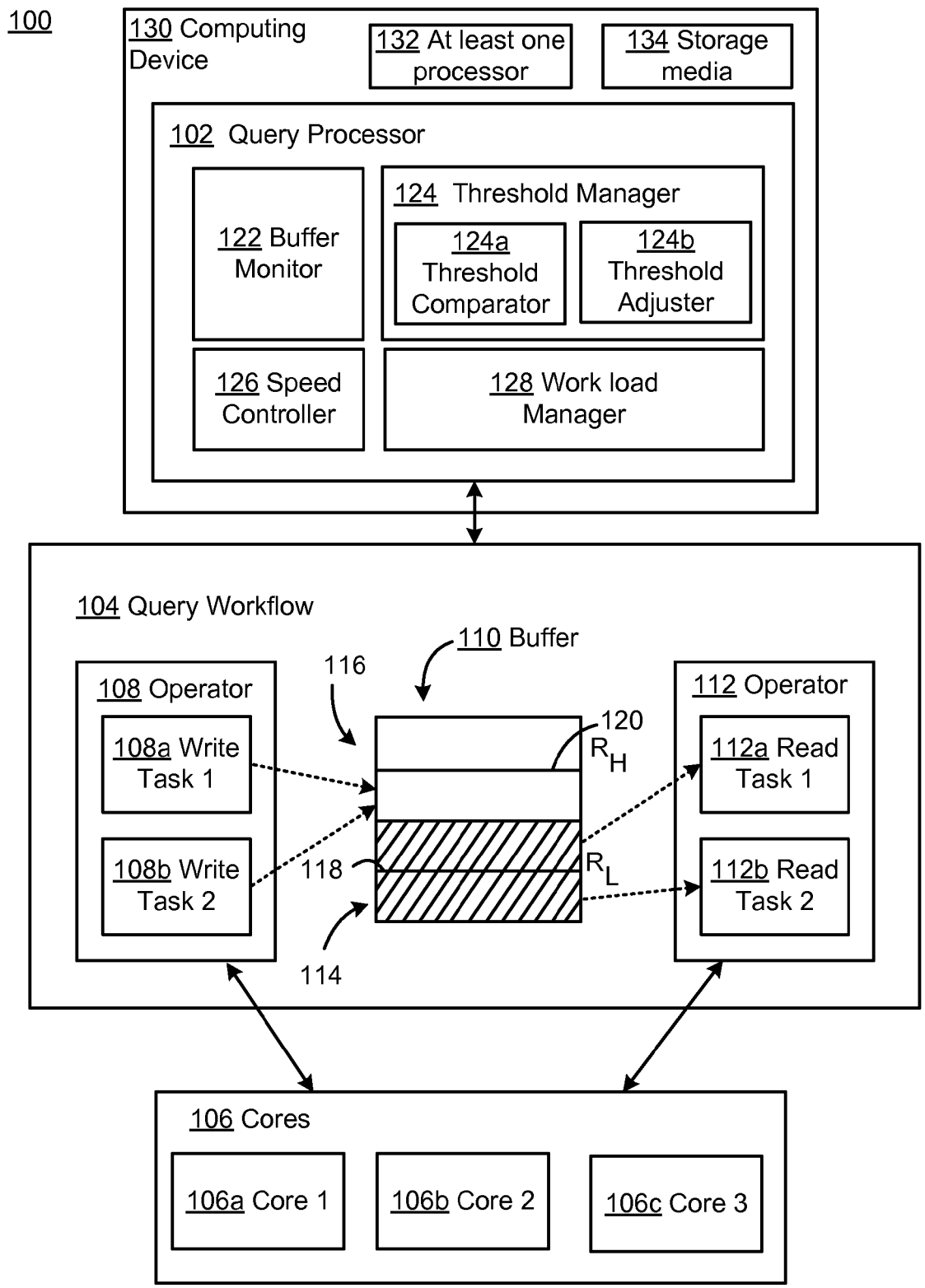
FIG. 1 is a block diagram of a system for multi-core query processing using asynchronous buffers.

FIG. 1 is a block diagram of a system 100 for multi-core query processing using asynchronous buffers. In the example of FIG. 1, a query processor 102 executes a query workflow 104, using a plurality of cores 106. More specifically, as referenced above, the query processor 102 is generally operable to process portions of the query workflow 104 in parallel, by assigning individual cores of the cores 106 to concurrently-executing portions of the query workflow 104.

In this regard, the term core(s) should be understood to refer to, or include, any multi-computing platform in which a plurality of processors, central processing units (CPUs), or other processing resources are available, including network/device clusters. For example, parallel query processing is known as an option for improving database performance on existing SMP/CMP (Symmetrical Multi-Processing/Chip-level Multi-Processing) servers, particularly for high performance database systems which are able to process huge volumes of data and complex queries efficiently. Thus, in the present description, it should be appreciated that the term core represents a unit(s) of processing power within any such environment in which multiple processing options are available.

As described in detail below, the query processor 102 may assign the cores 106 within and among the query workflow 104 in a manner which minimizes the need to switch or otherwise reassign individual cores from one portion of the query workflow 104 to another, during the processing of the query workflow 104. In this way, an efficiency of the system 100 may be improved, and/or an overall time to process the query workflow 104 may be reduced.

The query workflow 104 may generally represent virtually any multi-step query which involves processing of data from a database to obtain intermediate results, followed by further processing of such intermediate results to obtain further intermediate results, and so on until a final query result(s) is reached. A more detailed example of such a query workflow is illustrated and described below, with respect to FIG. 3.

Examples of such query workflows, by themselves, are well known in the art, and too numerous to mention in any detail. However, by way of example and not limitation, the query workflow 104 may represent a query workflow applied against an employee or a customer database of a business. For example, the business may have a customer database which includes millions of records, each corresponding to a particular customer and including various types of information about that customer. Consequently, the query workflow 104 may be designed to process such customer information in a desired fashion.

For example, the query workflow 104 may access the customer database in order to modify, update, or add a field in each customer record, and/or to perform some mathematical calculation using one or more fields of each customer record. The query workflow 104, for example, may access such a customer database in order to calculate an average age of customers having a certain characteristic, such as income level. The query workflow 104 may then take the results of such processing, and perform further processing thereon, such as, for example, updating the customer records of the customers having the selected characteristic (e.g., income level) with information regarding a most-recent purchase of each such customer. The results of such further processing may then be further processed by the query workflow 104, such as, for example, processing such results to predict possible future purchases of each such customer, for resulting optimization in soliciting such future purchases from each designated customer.

Thus, as referenced above, the query workflow 104 may generally be observed to include processing performed by an operator 108 on designated data, to obtain processed/intermediate results, which may be stored in a buffer 110. Subsequently, such processed/intermediate results may be read from the buffer 110 by a subsequent operator 112 of the query workflow 104, which may then execute further processing thereof. As just referenced, then, the operators 108, 112, by themselves, may represent virtually any mathematical or database (e.g., select, join, delete) operator desired by, or available, to a user of the system 100.

FIG. 1 shows a simplified example in which the operator 108 processes data and writes corresponding results into the buffer 110, while the operator 112 reads the results from the buffer 110 for further processing thereof. However, it may be appreciated that, more generally, virtually any number of operators and associated buffers may be used to perform a desired query processing for a particular query workflow. For example, it may be appreciated that the operator 108 may be configured to read data from a preceding buffer (not shown in FIG. 1), while, similarly, the operator 112 may be configured to write data to a subsequent or following buffer (also not shown in FIG. 1).

Thus, the query workflow 104 may generally include virtually any desired number of pairs of operators, with each pair having an intermediate buffer positioned therein between. In some examples, the query workflow 104 may include a chain, sequence, or series of such operator pairs having corresponding buffers positioned therein between, so that, as described, data from one or more databases may be processed repeatedly until a final result is achieved.

Figure 3:
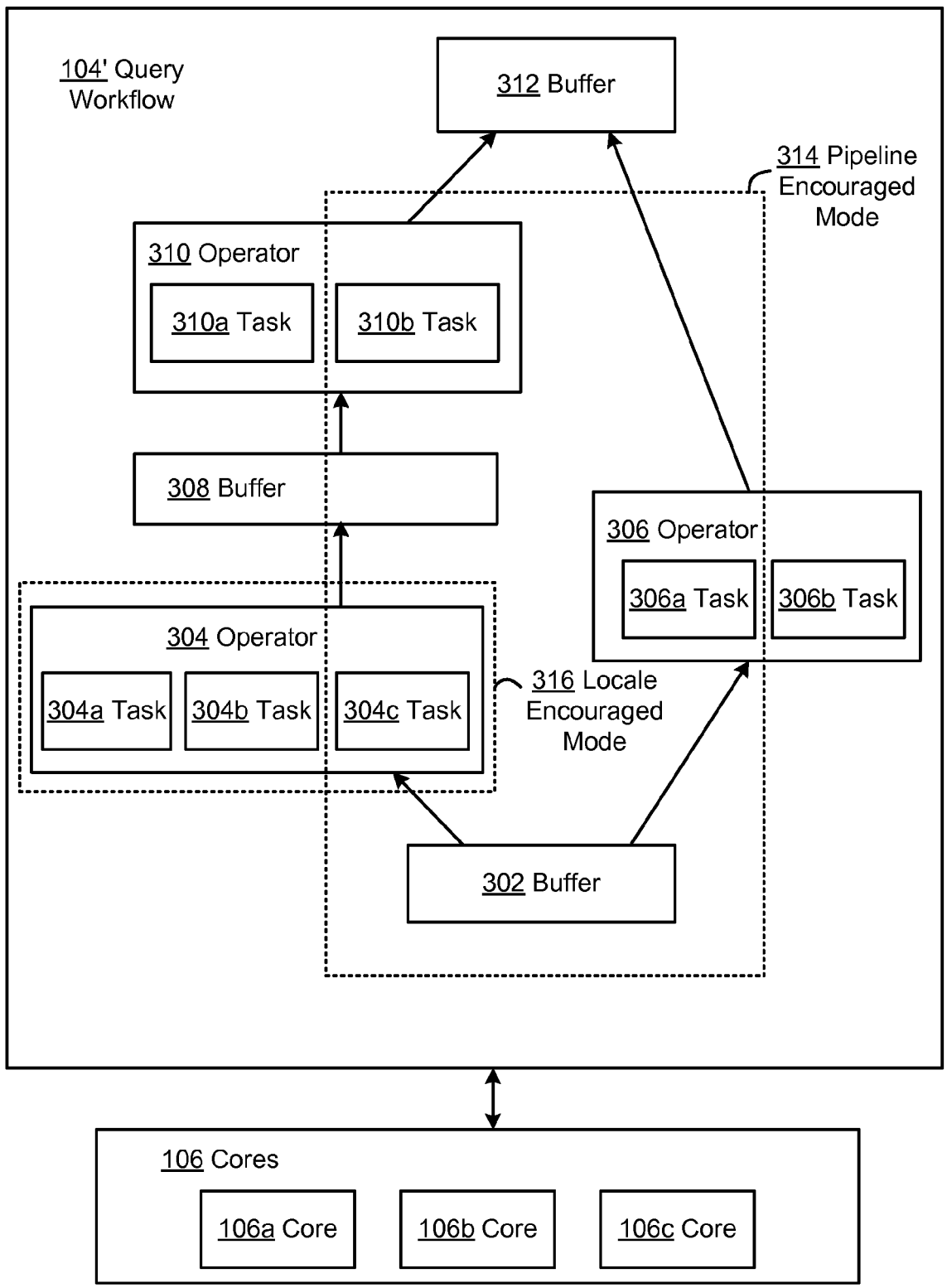
FIG. 3 is a block diagram of a more detailed example of a query workflow processed by the system of FIG. 1.

Even more generally, such chains or sequences of operators and buffers may be executed at least partially in parallel to one another, perhaps for subsequent joining thereof to obtain a combined result. As a result, in these and other examples, the query workflow 104 may be represented as directed acyclic graphs (DAG), in which various branches, loops, threads, or other workflow orders may be arranged for execution of the overall query workflow 104. FIG. 3 illustrates and describes specific examples of the use of such a directed acyclic graph in representing and executing the query workflow 104. However, it may be appreciated that the use of such directed acyclic graphs in the context of processing a query workflow is generally known, by itself, to those of skill in the art. Consequently, many examples and versions of the use of directed acyclic graphs (or other techniques) to represent and execute the query workflow 104 are not described in detail herein, except as necessary or helpful in understanding operations of the system 100.

In the example of FIG. 1, as referenced above, the query processor 102 may be configured to assign the cores 106 within and among the query workflow 104, for processing the query workflow 104 in a fast and efficient manner. For example, as shown, the operator 108 may include one or more particular operational tasks 108A, 108B, i.e., sub-tasks of the query being processed. Similarly, the operator 112 may include one or more operational tasks 112A, 112B.

In the example of FIG. 1, and in the subsequent description, the operator 108 and corresponding tasks 108A, 108B are referred to herein as a write operator and/or as write task(s), because (in the example) the operator 108 and associated tasks 108A, 108B are configured to write data into the buffer 110. Of course, as referenced above, the operator 108 may be a read operator, and the tasks 108A, 108B may be considered to be read tasks, when the operator 108 is previously operable to read data from a preceding buffer and the query workflow 104, although not explicitly illustrated in the example of FIG. 1. Similarly, the operator 112 may be referred to as a read operator, while the task 112A, 112B may be referred to as read task, because of the operation(s) thereof in reading data from the buffer 110 for further processing. Of course, the operator 112 and tasks 112A, 112B may be considered to be write operations/tasks with respect to results thereof being written into a subsequent buffer of the query workflow 104 (although, again, not specifically illustrated in the example of FIG. 1).

In operation, then, the query processor 102 may assign the cores 106 within the query workflow 104 by assigning one or more of the cores 106 to one or more of the operators 108, 112 and/or corresponding tasks 108A, 108B, 112A, 112B thereof. In the specific, simplified example of FIG. 1, the cores 106 are illustrated as including only three cores 106A, 106B, 106C. Of course, the cores 106 may include a large number of cores, and the specific cores 106A, 106B, 106C may represent a subset of the larger set of cores that is currently-assigned to process the operators 108, 112 with respect to the buffer 110.

In other words, other cores of the cores 106 may be currently assigned to other operators/buffers of the query workflow 104 (not shown in FIG. 1). Specific examples of assigning subsets of the cores 106 within and among different operators/buffers of the query workflow 104 are provided in detail, below, e.g., with respect to FIG. 3 and FIGS. 6-7.

As an extreme example to illustrate potential difficulties in assigning the cores 106, the query processor 102 could theoretically assign cores 106A, 106B to one or both of the write tasks 108A, 108B, while leaving the core 106C idle or assigned to another operator/buffer (not shown in FIG. 1). However, such an assignment would be impractical, and inefficient, because the write tasks 108A, 108B would quickly act to fill the buffer 110 to its capacity. Once full, writing to the buffer 110 by the task 108A, 108B would have to be at least temporarily suspended, and the cores 106A, 106B would have to be switched to execute another task(s), or to an idle mode.

Conversely, at the opposite extreme, the query processor 102 may theoretically assign both the cores 106A, 106B to the read tasks 112A, 112B. In this way, the operator 112 may quickly read all available data from the buffer 110. Again, however, the operator 112 would then quickly reduce a current content of the buffer 110 to zero, i.e., would empty the buffer 110.

In other, more practical examples of the operations of the system 100, the query processor 102 may assign at least one or more of the cores 106 to the operator 108, while simultaneously applying one or more of the cores 106 to the read operator 112. In this way, writing and reading may proceed in a parallel or overlapping fashion, so as to take better advantage of the availability of the plurality of the cores 106. For example, the core 106A may be applied to the write task 108A, while the core 106B may be applied to a read task 112A. In a hypothetical scenario in which write and read operations occur at the same speed, then it may be observed that the buffer 110 would reach a steady state in which content of the buffer is removed at approximately the same pace that additional content is added. In other words, a content of the buffer would remain essentially constant once a steady state is reached.

In practice, however, a number of factors may make it difficult or impossible to achieve such a steady state solution to managing contents of the buffer 110. For example, a speed of the write operation 108 may be different than a speed of the read operation 112, for example, due to a physical structure or method of operation of the buffer 110 itself. Consequently, in the example above, the core 106A may be applied to the write task 108A to cause writing of data to the buffer 110 at a first speed, while the core 106B may be assigned to the read task 112A to conduct reading of data from the buffer 110 at a second speed. As just referenced, the second speed of the reading operation 112 may be faster than the first speed of the writing operation 108. Consequently, over time, there will be a net reduction of data within the buffer 110, until the buffer 110 will become completely empty if not otherwise managed to avoid this outcome.

Therefore, in a further embodiment, the query processor 102 may assign the cores 106 in a manner designed to manage a usage of the buffer 110 in an optimized manner. For example, given the speed differences between the operations 108 and 112 as just referenced, the query processor 102 may assign two cores to the operator 108, e.g., may assign the core 106A to the write task 108A and the core 106B to the write task 108B. Then, the core 106C may be assigned to the read operator, e.g., to one or both of the read tasks 112A, 112B. Consequently, the relative slowness of the write operation 108 to the read operation 112 may be compensated by providing more resources (e.g., more cores 106) to the write operation 108.

In practice, however, such management of resources may lead to an overcompensation of the speed difference, so that, in this example, the write operation 108 may, on the whole, result in a net increase over time of the contents of the buffer 110, since the single core 106C executing the read operator 112 may not be capable of removing data from the buffer 110 at a pace which matches the speed of data insertion by the write operator 108 using both of the remaining cores 106A, 106B. Therefore, again, as referenced above, the buffer 110 may become full over time.

Thus, it may be observed that it may be difficult to manage resources of the system 100 in a manner which maintains an efficient use of the buffer 110 within the contents of the query workflow 104. Specifically, as referenced above, in either situation in which the buffer 110 may experience a net increase or decrease of stored data over time, it may occur that the query processor 102 is required to switch or reallocate one or more of the cores 106 between the write operator 108 and the read operator 112.

For example, in a case where the buffer 110 becomes full due to a net increase over time of the data contained therein resulting from a net positive difference in the speed of the write operator 108 using a certain number of the cores 106 relative to a speed of the read operator 112 using the same or different number of the cores 106, then it may be necessary for the query processor 102 to reassign one of the cores 106 from the write operator 108 to the read operator 112. For example, in the example above, in which the cores 106A, 106B are assigned to the write operator 108, while the core 106C is assigned to the read operator 112, the buffer 110 may become full over time, so that the query processor 102 may be required to switch the core 106B from the write operator 108 to the read operator 112. Of course, such a switch may itself, over time, result in the opposite difficulty of achieving a net reduction over time of the content of the buffer 110, so that the cores 106 may have to be continually switched within and among the operators 108, 112 by the query processor 102.

As is generally known, such switching of cores is generally undesirable, because of associated computing overhead that is required to execute the switch(es), and because of the associated increase in overall data processing time. For example, such switching may be associated with shutting down a task, fetching a new task, and starting the new task, which may require related communications with an underlying operating system, various cache (re)allocations, and program loading/initilizations. The system 100 of FIG. 1 and associated description herein provides techniques for minimizing such difficulties associated with switching cores between query tasks, and thereby reducing an amount of time needed to process a given query for a certain amount of data being processed.

FIG. 1 conceptually illustrates a level of contents of the buffer 110. Specifically, in FIG. 1, the buffer 110 is illustrated as including a filled portion 114 (shown as marked by hash marks in FIG. 1), and an empty portion 116. As described above, the filled portion 114 of the buffer 110 may change over time and may experience a net increase or decrease relative to the empty portion 116, depending on, e.g., relative speeds of the write operator 108 and relative to the read operator 112, a number of the cores assigned to a given one of the read operator 108 and read operator 112, or various other factors known to those of skill in the art.

Furthermore, in practice, it will be appreciated that the buffer 110 may use various techniques to allocate, store, and retrieve data from within the buffer 110. For example, as described and illustrated below in detail with respect to FIG. 4, the buffer 110 may be divided into various blocks of memory, so that the write operator 108 may be operable to write into designated empty blocks that are available at a given point in time within the buffer 110. The empty blocks may be dispersed within an overall structure of the memory of the buffer 110, depending on how previous data was written to or read from the buffer 110 during previous operations. Similarly, such blocks of the buffer 110 may be filled by data at a given point in time, so that the read operator 112 may need to first identify an appropriate block containing desired data within the buffer 110 before beginning to execute an actual reading of such data.

In other words, the filled portion 114 of the buffer 110 is conceptually illustrated as consuming a particular percentage or portion of the buffer 110, when in fact the filled portion 114 may more realistically be described as being dispersed within and among available blocks of the buffer 110. Similarly, the empty portion 116 is shown as a unitary or single portion of the buffer 110, but may in fact represent empty blocks of memory that are dispersed within the buffer 110. Other types in detail of the structure and use of such buffer 110 would be apparent to one of skill in the art, and therefore as described here in more detail, except as might be necessary or helpful to understand the operation of the system 100.

Thus, it may be observed that for a given batch of data that is initially input by the operator 108, there is a net amount of time required by the operators 108, 112 and the buffer 110 to process such data completely. The extent of this time may generally be determined by a speed of the write operator 108, the speed of the read operator 112, and a switching time during which the cores 106 are switched or reallocated within and among the operators 108, 112.

Other factors may contribute to the time necessary to process a given batch of data. For example, it may occur that at least one of the cores 106 is idle and not in use at a given point in time of the operation of the system 100. In such a case, such idle time may contribute to the overall time needed to process the data. In practice, however, the system 100 may be implemented in situations in which an amount of the data to be processed is very large relative to a number of cores available to execute the processing. Consequently, it may be undesirable to maintain any of the cores 106 in an idle stage, so that the idle time referenced above is essentially contributing to the processing time of a given batch of data may be ignored for purposes of the present description. Similarly, other incidental factors which may contribute in a relatively trivial manner to overall processing time may be ignored for the sake of clarity and conciseness of the present description.

The system 100, as referenced above, thus seeks to reduce the amount of time necessary to process a given batch of data, and to process the data in an optimal or most efficient manner, e.g., by optimally managing (e.g., minimizing) an extent or need for switching or reallocating the cores 106 within and among the operators 108, 112. That is, for example, by reducing the switching time referenced above as contributing to an overall time needed to process a given batch of data, then the system 100 may be operable to reduce the overall processing time accordingly, and to provide a more efficient use of the buffer 110 during operation of the query workflow 104.

Specifically, for example, the system 100 may maintain a first or low threshold $R_L$ 118 which is defined relative to the buffer 110, as well as a second or high threshold $R_H$ 120. Then, during the operation, the query processor 102 may execute to ensure that the filled portion 114 and the empty portion 116 of the buffer 110 remain within between the thresholds 118, 120. For example, when there is a net increase in the filled portion 114 due to a relatively increased speed of the write operator 108 as compared to the read operator 112, then, over time, the filled portion 114 may reach the high threshold $R_H$ 120. At this time, the query processor 102 may reassign cores 106 from the operator 108 to the operator 112. Conversely, if there is a net decrease in the amount of the filled portion 114 due to a relative speed of the read operator 112 as compared to the write operator 108, then eventually the filled portion 114 may be reduced to a point of reaching the low threshold $R_L$ 118, whereupon the query processor 102 may reassign cores 106 from the read operator 112 to the write operator 108. In this way, as referenced above, the filled portion 114 and the empty portion 116 may be maintained between the thresholds 118, 120, and switching of the cores 106 between the operators 108, 112 may be executed in a manner which optimally utilizes available resources in executing the query workflow 104.

In more detail, as shown, the query processor 102 may include a buffer monitor 122 which is configured to monitor a current level of fullness of the buffer 110. For example, the buffer monitor 122 may determine that the filled portion 114 is currently at a certain level relative to an overall capacity of the buffer 110. A threshold manager 124 may be configured to compare the output of the buffer monitor 122 describing the current filled level of the buffer 110, relative to the thresholds 118, 120. Specifically, a threshold comparator 124A may be configured to make such comparisons, described in more detail below. As also described in detail below, the threshold manager 124 may include a threshold adjuster 124B which may be configured to adjust the thresholds 118, 120 over time, so as to further optimize an operation and execution of the query processor 102.

Based on the results of the comparisons of the contents of the buffer relative to the thresholds 118, 120 by the threshold comparator 124A, a speed controller 126 may be configured to determine a type and extent of switching of the cores 106 within and among the operators 108, 112. For example, the speed controller 126 may be configured to determine that a default number of cores 106 should be reallocated in one direction or the other between the write operator 108 and the read operator 112. In other examples, the speed controller 126 may make more detail calculations in order to determine a number of a manner of cores to be switched. Examples of the speed controller 126 are provided in more detail below, e.g., with respect to FIG. 4.

Finally, a workload manager 128 may be configured to actually execute the reassignment of cores 106 within and among the operators 108, 112, based on an output of the speed controller 126. In further example embodiments, as referenced herein, the workload manager 128 may also be operable to assign subsets of the cores 106 within and among other operators then those specifically illustrated in the example of FIG. 1. For example, as described herein, the query workflow 104 may actually include a large number of write/read operators and associated buffers, even though only a single pair of write/read operators and associated buffer are illustrated in the simplified example of FIG. 1. Further, the cores 106 may include a much larger number of cores than the 3 cores, 106A, 106B, 106C illustrated in the simplified example of FIG. 1. Consequently, it may be necessary or desirable to assign various subsets of this larger number of cores within and among the larger number of operators/buffers of a more realistic or detailed example implementation of the system 100 of FIG. 1.

Thus, the workload manager 128 may be configured to assign subsets of the cores 106 within and among all the operators/buffers of the query workflow 104, in one or more manners that may be desirable or beneficial for a particular user of the system 100. For example, the workload manager 128 may be configured to assign the cores 106 such that at least a specific portion of the query workflow 104 is processed as quickly as possible (perhaps at an increased cost or risk of switching the cores 106 among the operators more frequently to accomplish this goal). In other example implementations, the workload manager 128 may be configured to assign the cores 106 so as to execute the query workload 104 in a manner that most efficiently utilizes resources of the system 100 (e.g., minimizes switching of the cores 106, perhaps at a cost of an overall speed reduction in providing final query results). Further discussion and examples of these aspects of operations of the workload manager 128 are provided below, e.g., with respect to FIGS. 3, 6, and 7.

In FIG. 1, it may be appreciated that the query scheduler 102 is generally associated with, or executed on, a computing device. In this sense, the computing device may represent more than one computing device, and will be understood to be associated with known hardware and software components, which are therefore not necessarily described here in detail. Although not specifically illustrated in FIG. 1, the computing device may include, or may access, e.g., one or more of any relational database and associated components (e.g., a database management system (DBMS), indices, tables, and/or actual data) that may be accessed by operators/tasks of the query workflow 104.

Thus, it may be appreciated that the term query as used herein may generally to refer to virtually any job that may be executed in parallel by the computing device of the query processor 102 with respect to available data. Other such uses and examples would be apparent from the field(s) of parallel computing, and are not necessarily discussed herein, so that it should be understood that the examples that are provided are included merely for the sake of illustration and example, and therefore should not be considered limiting.

In the example of FIG. 1, the query processor 102 is illustrated as executing on a computing device 130, which may be any conventional computing device equipped to execute the structure and function of the system 100 of FIG. 1. For example, the computing device 130 is illustrated as including at least one processor 132 that may be configured to read instructions from a storage media 134 to execute the query processor 102. The at least one processor 132 is illustrated separately from the cores 106, but it may be appreciated that the at least one processor may include one of the cores 106. The at least one processor 132 and storage media are illustrated on a single computing device 110, but may, of course, execute on a plurality of computing devices, which may be networked together or otherwise in communication with one another. The cores 106 and the elements 108, 110, 112 of the query workflow 104 may exist on, or be executed by, the computing device 110, and/or on one or more other computing devices. Further, although the elements 122-128 of the query processor 102 are illustrated separately from one another on the computing device 110, it may be appreciated that the elements 122-128 may be implemented in many different configurations. For example, any two or more of the elements 122-128 may be executed as a single element (e.g., the speed controller 126 may be executed as part of the workload manager 128), while any one of the elements 122-128 may be further divided into multiple sub-elements (e.g., the workload manager 128 may be divided for assigning cores 106 with respect to a single buffer, and for assigning cores 106 within the various buffers of the query workflow 104 as a whole). Various other example implementations and modifications would be apparent to one of skill in the art.

Figure 2:
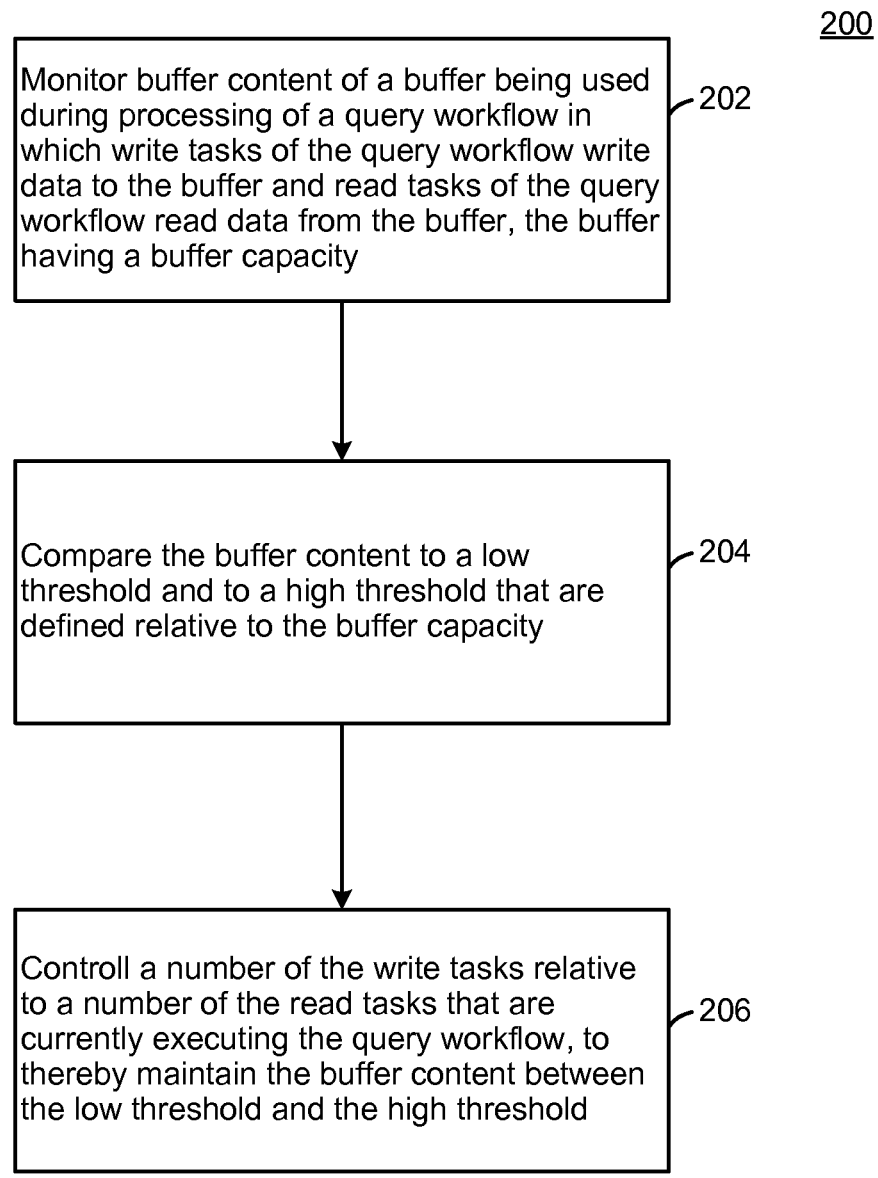
FIG. 2 is a flowchart illustrating example operations of the system of FIG. 1.

FIG. 2 is a flowchart 200 illustrating example operations of the system 100 of FIG. 1. In the example of FIG. 2, operations 202-206 of the system 100 of FIG. 1 are illustrated in sequential order. However, it may be appreciated that such illustration is merely for example and is not considered to be limiting in any way. For example, additional or alternative operations may be included within the flowchart 200. Moreover, the operations 202-206 may be performed in a parallel, overlapping, or different order than that specified in the example of FIG. 2.

In FIG. 2, buffer content of a buffer being used during processing of a query workflow in which write tasks of the query workflow write data to the buffer and read tasks of the query workflow read data from the buffer may be monitored, the buffer having a buffer capacity (202). For example, the buffer monitor 122 may be configured to count filled memory blocks relative to empty memory blocks of the buffer 110, during a writing thereto by the write task(s) 108a and/or 108b, and during a reading therefrom by the read task(s) 112a and/or 112b. Specific examples of a structure and use of such memory block are provided below, e.g., with respect to FIG. 4.

The buffer content may be compared to a low threshold and to a high threshold that are defined relative to the buffer capacity (204). For example, the threshold manager 124, e.g., the threshold comparator 124a, may be configured to compare the filled memory blocks representing the buffer contents to a low threshold $R_L$ 118 and to a high threshold $R_H$ 120.

A number of the write tasks may be controlled relative to a number of the read tasks that are currently executing the query workflow, to thereby maintain the buffer content between the low threshold and the high threshold (206). For example, the speed controller 126 may be configured to adjust an overall writing speed of new content to the buffer 110 relative to an overall reading speed of stored content from the buffer 110. For example, when the buffer content reaches the high threshold $R_H$ 120, the speed controller 126 may be configured to instruct the workload manager 128 to deactivate one or more write tasks 108a, 108b by switching an assigned core(s) 106 therefrom to one or more of the read tasks 112a, 112b. Conversely, as described above, when the buffer content reaches the low threshold $R_L$ 118, the speed controller 126 may be configured to instruct the workload manager 128 to deactivate one or more read tasks 112a, 112b by switching an assigned core(s) 106 therefrom to one or more of the write tasks 108a, 108b.

FIG. 3 is a block diagram illustrating a more detailed example of the query workflow 104 of FIG. 1, illustrated in the example of FIG. 3 as the modified query workflow 104'. As shown in FIG. 3, and as referenced above in the context of FIG. 1, the modified query workflow 104' may include a larger number of write/read operators and associated buffers within the context of the larger query workflow 104', and the query workflow 104' may be expressed as a directed acyclic graph (DAG) which directs an overall order and sequence of the query workflow 104'.

Specifically, as shown, the query workflow 104' includes a buffer 302 from which data is read by a read operator 304 which includes task 304A, 304B, 304C. Data is also read from the buffer 302 by a read operator 306, which includes read task 306A, 306B. Subsequently, the operator 304 acts as a write operator with respect to a second buffer 308, i.e., the tasks 304A, 304B, 304C write data according to the operator 304 into the buffer 308. Similarly, the operator 306 acts as a write operator with regard to a buffer 312, i.e., again, the task 306A, 306B write data according to the operator 306 into the buffer 312. Further, an operator 310 reads data from the buffer 308. Specifically, tasks 310A, 310B read data from the buffer 308 for processing according to the operator 310. Thereafter, the operator 310 acts as a write operator with respect to the buffer 312, so that the task 310A, 310B write data according to the operator 310 into the buffer 312.

In the example of FIG. 3, then, a more detailed query workflow is illustrated, and is illustrated in conjunction with the cores 106A, 106B, 106C of the cores 106 of FIG. 1. Of course, it will be appreciated that the query workflow 104' may yet be further extended to include many more pairs of operators (and associated buffers). Moreover, of course, there may be many more cores than the 3 cores 106A, 106B, 106C of the cores 106 to be assigned within and among all the operators of the query workflow 104'.

As referenced above, the workload manager 128 may be configured to assign the cores 106 within and among the entirety of the query workflow 104'. That is, the workflow manager 128 may be configured to assign one or more cores to each of (or as many as possible) of the various operator pairs and associated buffers. According to a manner in which the workload manager 128 is configured to implement such assignments of the cores 106, different objectives may be reached for the processing of the query workflow 104'. For example, the workload manager 128 may be configured to assign the cores 106 in a manner which optimizes an overall speed at which at least an initial or partial result is returned to the user (i.e., stored in the final buffer 312), wherein such implementations may experience a relative loss of efficiency due to an increased risk of frequency of switching the cores 106 among the various tasks. In other example implementations, workload manager 128 may be configured to assign the cores in a manner which executes the query workflow 104' in a manner which most efficiently utilizes the cores 106, e.g., minimizes switching of the cores 106 between tasks, at a cost of a relatively reduced overall speed of a returned query result.

For example, in a pipeline encouraged mode, illustrated in FIG. 3 by dashed line box 314, the workload manager 128 may be configured to assign the cores 106 in a distributed manner throughout the query workflow 104' from a beginning to an end of the query workflow 104', so that operations are maximized or optimized for particular related tasks of the operators to which the cores are assigned. For example, as shown, the pipeline encourage mode 314 includes assignment of cores to tasks 304C, 306A, and 310B. By assigning the cores 106A, 106B, 106C to the tasks 304C, 306A, 310B, data processed by these tasks may be processed as quickly as possible, so that a final result of such processed data for the tasks 304C, 306A, 310B may be written to the final buffer 312 as quickly as possible. However, it may be appreciated that assigning the cores 106 in this manner has the disadvantage of disbursing core resources throughout the length of the query workflow 104', so that tasks of an individual operator as a whole (e.g., the operator 304) will not proceed as quickly or as efficiently as possible.

Conversely, in another operational mode, the workload manager 128 may execute a locale encouraged mode illustrated by a second dash line box 316 in the example of FIG. 3. In such in an example, the cores 106 are focused and concentrated on a particular region (e.g., a single operator 304 in the example of FIG. 3), so that overall operations associated therewith may be completed in their entirety as quickly as possible. For example, the cores 106A, 106B, 106C may be assigned respectively to task 304A, 304B, 304C, as illustrated by the locale encouraged mode 316. In such a case, operations of the operator 304 may be completed in their entirety for all tasks included therein sooner than would occur in the example of the pipeline encouraged mode 314 (and with less associated need for switching the cores 106 assigned thereto to a different buffer/operator pair).

Thus, configuration of the workload manager 128 with respect to assigning subsets of the cores 106 within and among the various operators of a given query workflow may be arranged according to an overall desire or preference of the user with respect to the query workflow 104'. More detailed examples of such assignment of cores within the query workflow 104' by the workload manager 128 are provided below, e.g., with respect to FIGS. 6 and 7.

Figure 4:
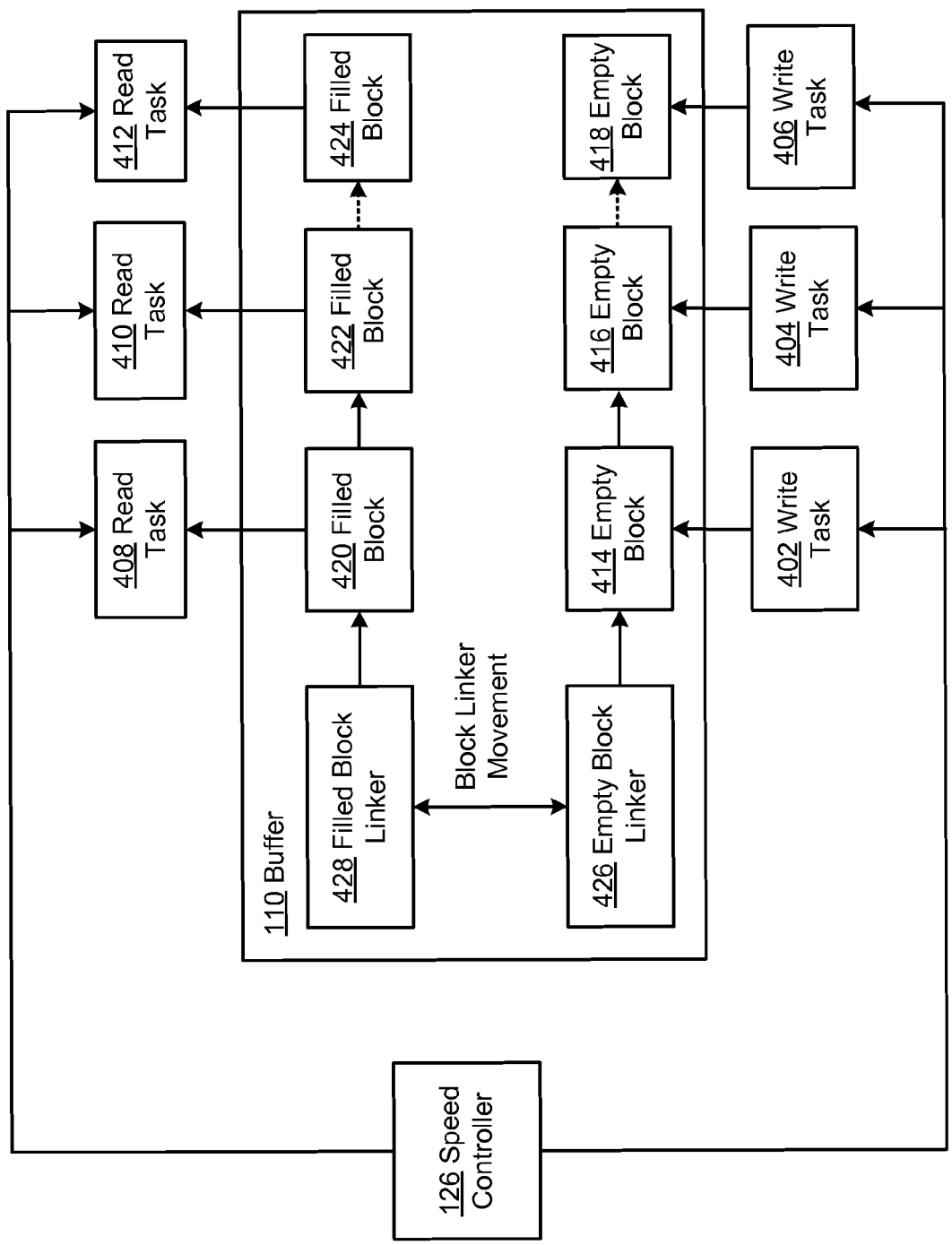
FIG. 4 is a block diagram of an example buffer structure used in the system of FIG. 1.

FIG. 4 is a block diagram illustrating a more detailed example implementation of a structure and function of the buffer 110 in the context of FIGS. 1 and 3. As referenced above, with respect to FIGS. 1 and 2, the system 100 may be configured to manage an overall current content of the buffer 110, so as to minimize switching between the various operators/tasks of the associated operators of the query workflow.

That is, as illustrated conceptually in FIG. 1, this implies that a certain percentage or proportion of the buffer 110 may be filled at a given point in time (e.g., as shown by filled portion 114 in FIG. 1), while other portions of the buffer 110 may be empty (e.g., shown as empty portion 116 in the example of FIG. 1). As referenced above, the actual physical structure of the buffer 110 may include various blocks or other sub portions into which the physical memory structure of the buffer 110 is divided. In other words, for example, various such blocks of the buffer 110 may be filled with data written from a preceding write operator, while other blocks of the buffer 110 dispersed therethrough may be empty, as data therefrom may have been read by corresponding, subsequent read operator(s). In other words, filled blocks may be dispersed within the buffer 110 at various locations, while empty blocks similarly may be dispersed throughout the buffer 110.

In general, such structure and function of the buffer 110, by themselves, are well known in the art, as well as associated techniques for executing actual writing to, and reading from, the buffer 110. As may be appreciated, depending on a timing and amount of data to be written to or read from the buffer 110, a location of filled blocks and empty blocks, relative to one another, within the buffer 110, may essentially be random or unpredictable over time.

In the example of FIG. 4, it is illustrated that various write tasks 402, 404, 406 may operate to write data to the buffer 110, while various read tasks 408, 410, 412 may be configured to read data from the buffer 110, according to the operations described above in the examples of FIGS. 1-3. As described with respect to FIGS. 1 and 2, the speed controller 126 may be configured to activate or deactivate any one or more of the write tasks 402-406 and/or the read tasks 408-412, so as to maintain a current content level of the buffer 110 as being in between the thresholds 118, 120.

In so doing, the buffer 110 may be appreciated to include, as just described, empty blocks 414, 416, 418 into which the write tasks 402, 404, 406 may be configured to write data during a time when allowed by the speed controller 126. Similarly, the read tasks 408, 410, 412 may read data from corresponding filled blocks 420, 422, 424, again, during times allowed by the speed controller 126.

Since, as described, the various blocks of the buffer 110 may be dispersed at any given point in time, linking structures may be used in order to locate filled blocks relative to one another and relative to empty blocks within the buffer 110. Specifically, as shown, an empty block linker 426 may be used to link the empty blocks 414, 416, 418. Similarly, a filled block linker 428 may be configured to link the filled blocks 420, 422, 424. During operation of the buffer 110, and as described, various filled blocks will be emptied, while various empty blocks will be filled. Consequently, as shown, block linker movement occurs between the linkers 426, 428, in order to reflect such changes in the status of individual blocks. E.g., when an empty block is filled by writing tasks, the pointer of the associated blocks should be attached to the linker list of the filled block linker 428. When a filled block is read to empty by reading tasks, such a block may be returned back to the linker list of the empty block linker 426.

Thus, it may be appreciated that at any given point in time, a number of filled blocks of the buffer 110 may be linked to one another, and available for reading therefrom by associated read tasks of the subsequent read operator. Similarly, the various empty blocks within the buffer 110 may be linked and available for writing thereto by various write tasks of the appreciating write operator. Taken as a whole, it may be observed that all the filled blocks, thus linked, represent the filled portion 114, while all the linked empty blocks represent the empty portion 116 of the buffer 110 as illustrated in the example of FIG. 1. Moreover, it may be observed that a corresponding operation of the buffer monitor 122 may be executed by counting the number of filled and/or empty blocks of the buffer 110, relative to the defined thresholds 118, 120.

In the example of FIG. 4, a speed of a reading task may be expressed as $\Delta_r(n)$, while a speed of writing tasks may be expressed as $\Delta_w(m)$. Then, Eq. (1) may be used to express a speed $\Delta_s$ of filling or emptying of buffers, e.g., the buffer 110:

$$\Delta_s = \Delta_r(n) - \Delta_w(m) \qquad \text{Eq. (1)}$$

In time T, a number of filled blocks may be expressed as D(T), so that over an execution time t, a number of filled blocks is changed to D(T+t), which thus may be alternately expressed as in Eq. (2):

$$D(T+t) = D(T) + \Delta_s \times t \qquad \text{Eq. (2)}$$

For an execution over the time interval t, as described herein, the threshold comparator 124a may determine the buffer content relative to the thresholds 118, 120. The speed controller 126 may then be responsible for activating/deactivating tasks as described herein. As described, a number of techniques may be used to determine an extent to which a speed of writing/reading may be increased/decreased (e.g., to determine how many tasks to activate/deactivate, and/or how many cores to reassign from a writing task to a reading task, or vice-versa). Eqs. 3 and 4 illustrate example technique(s) for determining an execution of the threshold comparator 124a and the speed controller 126 in this regard:

$$\text{Switch}(T+t) = \begin{cases} \text{Adjust}(n, m) & r_L < D(T) + \Delta_s \times t \\ \text{Adjust}(n, m) & r_H > D(T) + \Delta_s \times t \\ 0 & \text{Others} \end{cases} \qquad \text{Eq. (3)}$$

As shown in Eq. (3), the number of reading tasks n may be made smaller, and the number of writing tasks m may be made larger, when the number of filled blocks is less than the threshold $R_L$ 118. Conversely, the number of reading tasks n may be made larger, and the number of writing tasks m may be made smaller, when the number of filled blocks is greater than the threshold $R_H$ 120.

Once it is determined by the threshold comparator 124a that an adjustment is needed, the speed controller 126 may determine how to implement the adjustment. For example, Eq. (4) shows that if the total content capacity (e.g., number of blocks) of the buffer 110 is D, then when the number of empty blocks is less than the number of current writing tasks, some tasks may have to be switched to reading tasks since there are not enough blocks for the writing tasks to reserve. The same situation occurs for reading tasks when there are not enough filled blocks to be read. Otherwise, a constant $\text{Step}_{predefine}$ may be set as a default number of tasks which should be switched by the speed controller in response to a determination of a crossing of one of the thresholds 118, 120 within the buffer 110.

$$\text{Adjust}(n, m) = \begin{cases} (m - (D - D(T))) & m < D - r_L \\ (n - D(T)) & n > r_H \\ \text{Step}_{predefine} & \text{Others} \end{cases} \qquad \text{Eq. (4)}$$

From Eq. (3), in one example embodiment, the threshold $R_L$ 118 should be as low as possible to avoid task switching. Eq. (4) shows that, at a minimum, a number of empty tasks should be larger than a current number of writing tasks (since, otherwise, writings tasks have to be switched to reading tasks, as just described, due to lack of room for new data). The same limitations exist for the threshold $R_H$ 120.

Figure 5:
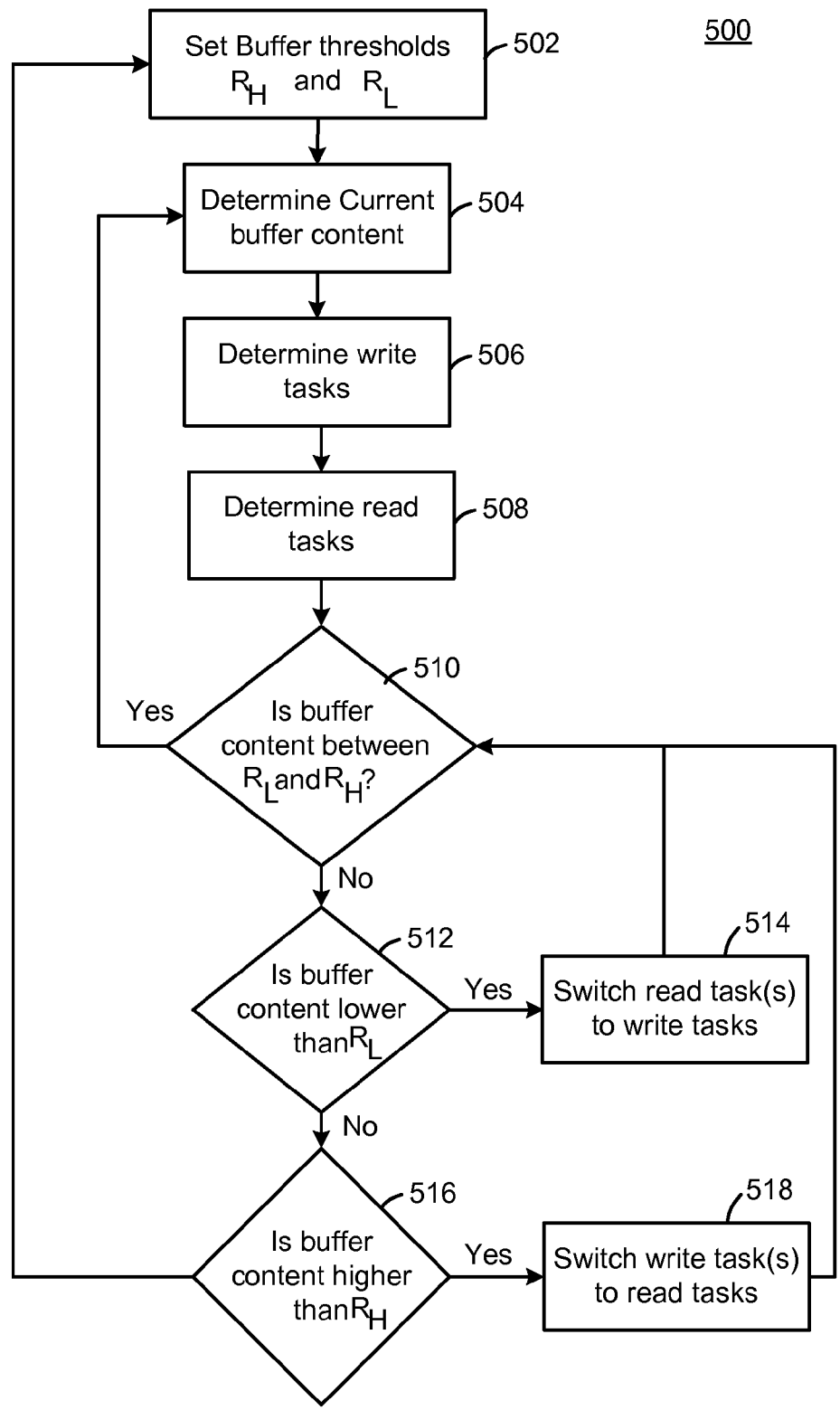
FIG. 5 is a flowchart illustrating example operations for switching cores between query tasks when processing a query workflow using the system of FIG. 1.

FIG. 5 is a flowchart 500 illustrating example operations for managing current content of the buffer 110 by dynamic adjustment of assignment of the cores 106 within and among the operators 108, 112. In other words, FIG. 5 provides more detailed example operations of the flowchart 200 of FIG. 2, and other operations of the system 100 of FIG. 1 (and similarly for FIG. 3), with specific reference to the buffer structure illustrated above with respect to FIG. 4.

In the example of FIG. 5, buffer thresholds 118, 120 are set at an initial level(s) (502). In a first iteration, the buffer thresholds 118, 120 may be set to default levels, or may be set based on empirically observed and detected levels, e.g., based on previous executions of the flowchart 500 with respect to previous operators of the query workflow 104.

Then, a current content of the buffer 110 may be determined (504). Again, in the first instance, the buffer 110 may be empty, or may have at least some data stored therein for use in execution of the associated write/read operators 108, 112. Of course, in later iterations, as described below, the buffer content may be partially filled, as a result of write operations of the write operator 108, as may be determined, e.g., by the buffer monitor 122.

Subsequently, write tasks may be determined (506). For example, the operator 108 may have a plurality of write tasks 108A, 108B, as shown above with respect to FIG. 1, some or all of which may be active (e.g., may have one or more cores assigned thereto for execution thereof). A number of total or active/inactive write tasks may thus be determined, e.g., by one or more of the components of the query processor 102, such as, e.g., the speed controller 126. In the same context, the write task 402, 404, and/or 406 in the example of FIG. 4 may be determined.

In essentially the same manner, associated read tasks may be determined (508). For example, again, the speed controller 126 may determine the read tasks 112A, 112B of FIG. 1, or, in the example of FIG. 4, the read tasks 410, 412, 414. That is, the speed controller may determine whether and how many of such read tasks exist, and/or whether such read tasks are currently active or inactive.

If the buffer content is determined to be between the threshold $R_H$ 120 and the threshold $R_L$ 118 (510), then monitoring of the buffer content may continue (504). If not, then the threshold comparator 124A may determine whether the buffer content is lower than the threshold $R_L$ 118 (512). If so, then the speed controller 126 may execute to switch a number of read tasks into an inactive mode, and to correspondingly activate a number of previously inactive write tasks (514). For example, as described above, the speed controller 126 may maintain a number of write/read tasks such that the write tasks do not exceed a number of empty blocks and/or that the read tasks do not exceed a number of filled blocks, and may otherwise have a default number of read tasks to activate any corresponding default number of write tasks to activate. In other example embodiments, other algorithms may be used to determine an appropriate number of read tasks to inactivate and/or write tasks to activate as discussed in some detail below.

Afterwards, the threshold comparator 124A may again make a determination as to whether the buffer content is between the threshold $R_L$ 118 and $R_H$ 120 (510). If not, and if the buffer content is not lower than the threshold $R_L$ 118 (512), as just described, then the threshold comparator 124A may make a determination as to whether the buffer content is higher than the threshold $R_H$ 120 (516). If so, then the speed controller 128 may be configured to switch write tasks to read tasks (518), e.g., by deactivating a number of currently active write tasks and simultaneously activating a corresponding number of read tasks. As described, such activation and deactivation may occur through operation of the reassignment of one or more of the cores 106 by the workload manager 128, as described above. On the other hand, if the buffer content is not higher than the threshold $R_H$ 120 (516), then the buffer thresholds 118, 120 may be examined and potentially reset to different levels (502). For example, the threshold adjuster 124B may be configured to reset one or both of the thresholds 118, 120, in order to further optimize, in a dynamic fashion, use of the cores 106 and executing the current workflow 104. Specific techniques and considerations for executing such threshold adjustment are provided in detail below with respect to algorithm 1.

Algorithm 1

```
 1: FUNCTION TC
 2: IN/OUT: Buffer, intermediate buffer structure
 3: IN/OUT: TS_r, task set for reading
 4: IN/OUT: TS_w, task set for writing
 5: BEGIN
 6:    white Buffer.D(T) is not between Buffer.r_L and
       Buffer.r_H do
 7:       if Buffer.D(T) < Buffer.r_L then
 8:          Switching(TS_r, TS_w, Step_predefined)
 9:       end if
10:       if Buffer,D(T) > Buffer.r_H then
11:          Switching(TS_w, TS_r, Step_predefined)
12:       end if
13:       Buffer.r_L = Count(TS_r)
14:       Buffer.r_H = D – Count(TS_w)
15:    end while
16:    return
17: END
```

In Algorithm 1, the Buffer structure is assigned as an input parameter in line 2, along with the task set TSr and TSw in lines 3 and 4. A while loop from lines 6 to 15 adjusts the thresholds 118, 120 to adapt a current number of filled memory blocks. From lines 7 to 9, if the number of filled blocks is less than the threshold $r_L$, the speed controller 126 may be active to switch a batch of reading tasks into writing tasks. The converse action is described from line 10 to line 12. In line 13 and line 14, the thresholds are updated to align with the number of reading and writing tasks, respectively. With the end of algorithm, the buffer is updated by new setting of thresholds, and the number of tasks are also updated to make the best responding speed. For example, as described, the threshold $r_L$ may be set as low as possible while maintaining a minimum number of filled blocks corresponding to a number of reading tasks, while the buffer $r_H$ may be set to avoid having a larger number of writing tasks than available empty blocks.

Figure 6:
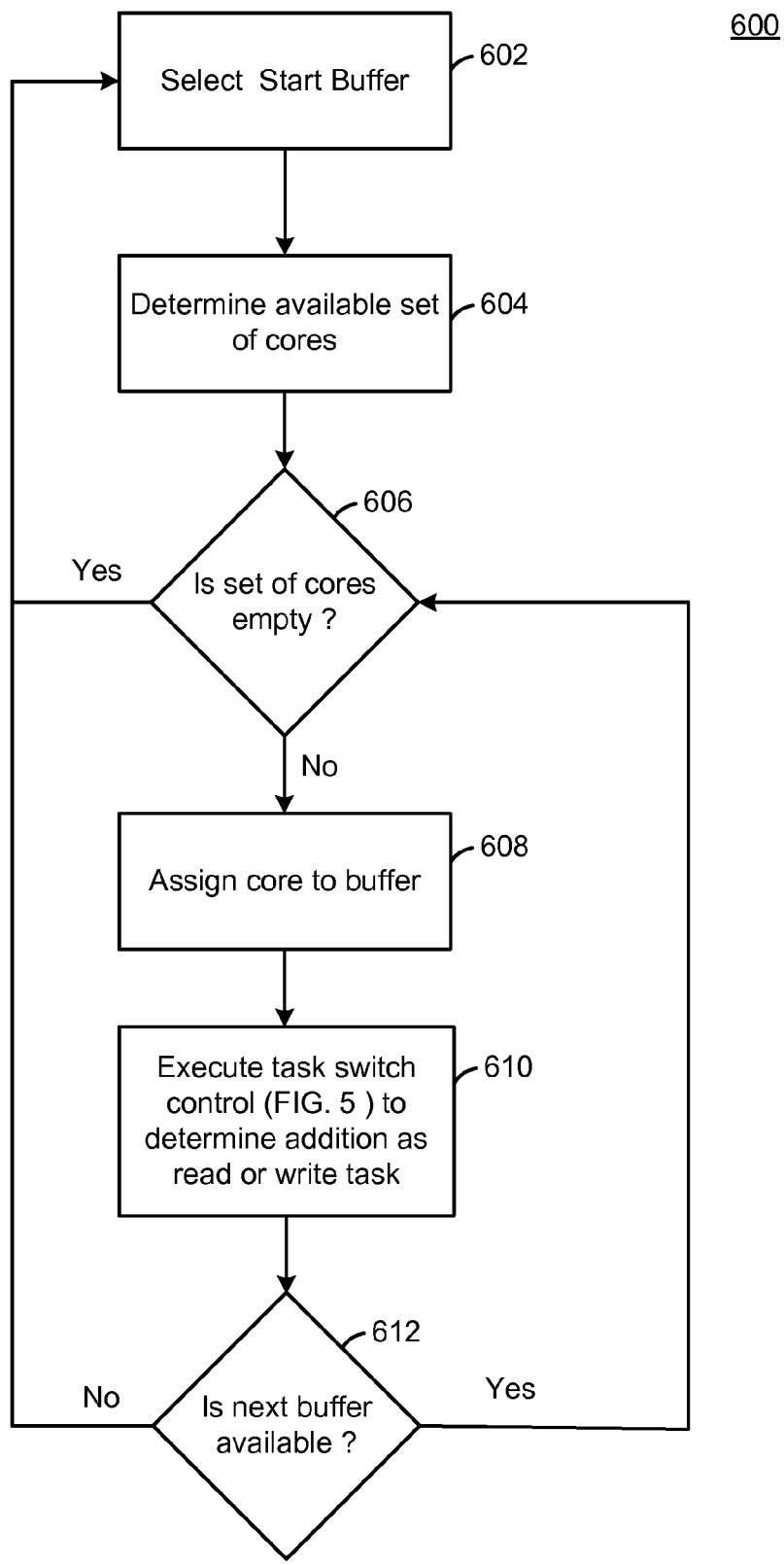
FIG. 6 is a flowchart illustrating first example operations for assigning cores among multiple buffers of a query workflow, using the system of FIG. 1.

FIG. 6 is a flowchart 600 illustrating example techniques for assigning cores within an overall query workflow. More specifically, as referenced above with respect to FIG. 3, the flowchart 600 illustrates a technique for assigning the cores 106 within the query workflow 104', according to the pipeline encouraged mode 314, in which the cores are assigned as to maximize a speed of obtaining at least a portion of a particular result of a designated task set. Thus, in pipeline encouraged mode, each operator in the query workflow achieves resources to process the data. As a result, pipeline parallelism is encouraged to generate at least partial results of the query workflow as quickly as possible. Since the overall number of cores is typically constant, the average number of cores working for every buffer is relatively low, so that, correspondingly, a risk for switching cores between tasks becomes relatively high.

Thus, in the example of FIG. 6, operations began with the selection of a start buffer (602). For example, such a start buffer may be represented by the buffer 302 of FIG. 3. More generally, the start buffer may represent literally the first buffer in a query workflow, or a first-selected buffer for application of the flowchart 600 operations.

Thereafter, an available set of cores may be determined (604). For example, the workload manager 128 may determine a current number of available cores within the overall set of cores 106. In the example of FIG. 3, the workload manager 128 may determine, for example, that the 3 cores 106A, 106B, 106C are available for assignment to the query workflow 104' within the pipeline encouraged mode 314.

The workload manager 128 may determine whether the set of cores is empty (606). If so, and therefore no cores are available for assignment, then the workload manager 128 may simply return to the start buffer (602) in anticipation of cores later becoming available as a result of reassignment from other tasks.

On the other hand, if the set of cores is not empty (606), then the workload manager 128 may assign a selected core to the start buffer (608), e.g., to the start buffer 302 in the example of FIG. 3.

At this point, the query processor 102 may execute the tasks which control techniques described above, e.g., with respect to FIG. 5 and/or Algorithm 1, so as to determine whether to add the newly assigned core to a read or a write task associated with the selected buffer, according to the optimization techniques and associated considerations described above. For example, the workload manager may assign a core 106A to the task 304C, and may assign the core 106B to the task 306A.

Once such assignment is complete, the workload manager 128 may determine whether a next buffer is available (612). For example, the workload manager 128 may determine that the buffer 308 is the next available buffer. Given that the next buffer 308 is available, the workload manager 128 may again determine whether the set of available cores is empty (606). If not, the process may be repeated to assign available cores to the selected buffer (608), i.e., to assign the core to a corresponding read or write task, as described. For example, the core 106C may be added to the task 310B as a read task for the buffer 308.

Thus, operations may continue with the available cores and buffers (606-612), until no buffer is available (612), or until the set of available cores is empty (606). In such a case, the workload manager 128 may revert to the start buffer 302 either to continue assigning available cores, if any, or to wait for further cores to become available.

Algorithm 2 shows a similar example for operations of the workload manager 128 in the pipeline encouraged mode.

Algorithm 2

```
 1: FUNCTION PEM
 2: IN/OUT: Buffer, one buffer of workflow
 3: IN: CS, core set for data process
 4: BEGIN
 5:    if CS is empty then
 6:       return
 7:    end if
 8:    Assign(Buffer, 1)
 9:    TC(Buffer, TS_r, TS_w)
10:    if Buffer.next is not null then
11:       PEM(Buffer.next, CS – 1)
12:    else
13:       PEM(StartBuffer( ), CS – 1)
```

Algorithm 2

```
14:    end if
15:    return
16: END
```

As shown, a recursive function may be used to describe the core assignment. In line 2 and 3, Buffer and CS (available cores) are set as the input. Usually, as described, the Buffer is the start buffer of the query workflow. Lines 5 to 7 describe the condition of function return, which occurs when no cores are available for task execution. In line 8, a core is assigned to current buffer, either as a reading task or writing task, by following the threshold controlling adjustment of Algorithm 1 in line 9. Then, if the current buffer is not the end of workflow, the Algorithm continues until the end buffer is reached, or until the set of cores CS is empty.

Figure 7:
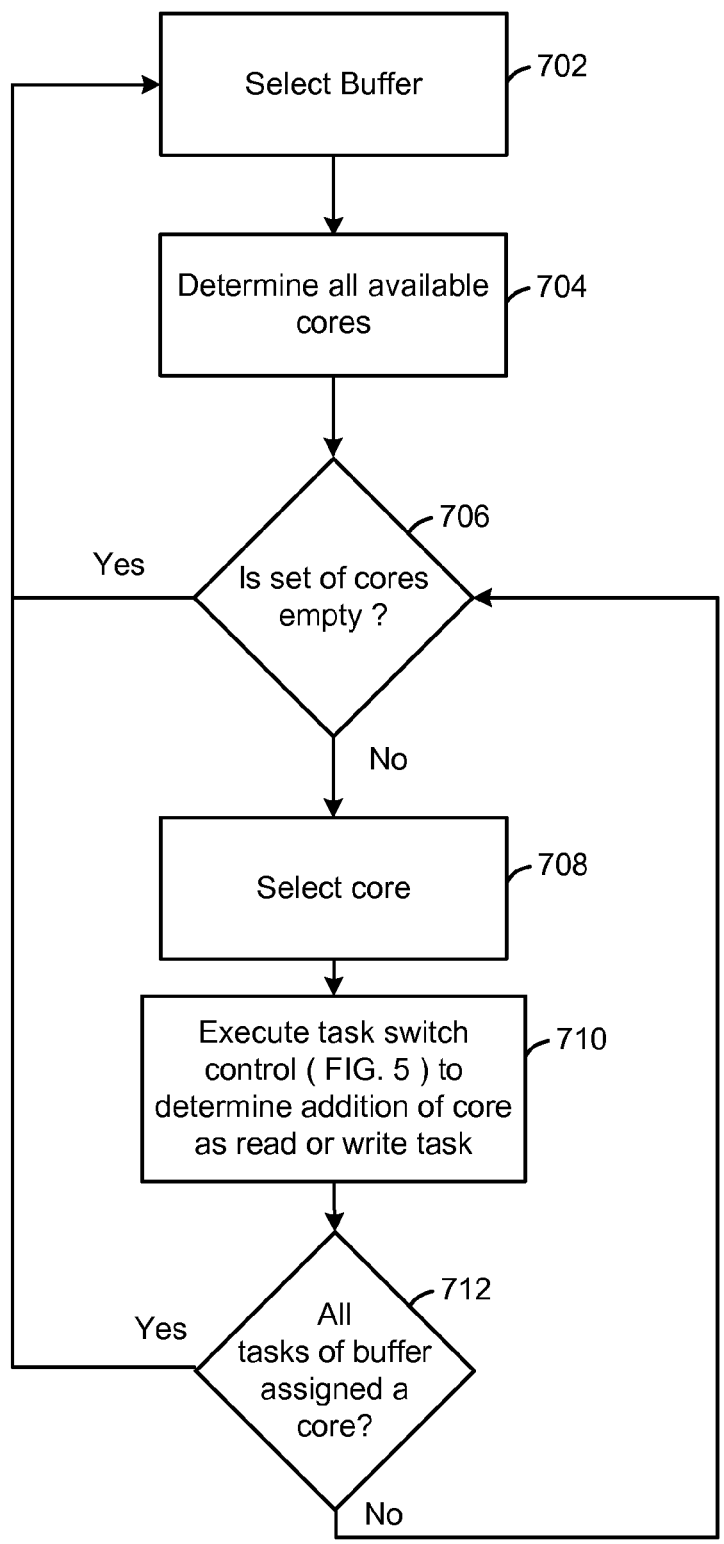
FIG. 7 is a flowchart illustrating second example operations for assigning cores among multiple buffers of a query workflow, using the system of FIG. 1.

FIG. 7 is a flowchart 700 illustrating a second example implementation for assignment of the cores within and among the query workflow 104. More specifically, FIG. 7 illustrates the example operations for implementing the locale encouraged mode 316 illustrated in FIG. 3 with respect to the modified query workflow 104'. As referenced herein, in such a mode, an active window is limited on a special part of the query workflow, which is then finished as quickly as possible. As a result, the data in a start buffer may be processed and moved into upper layer(s). In this mode, since all cores are arranged into limited number of buffers, the risk for task switching becomes relatively low. However, since most cores are assigned for internal data processing, the first result of workflow is not provided as quickly as in the pipeline encouraged mode 314 of FIGS. 3 and 6.

Thus, in FIG. 7, a buffer is selected for assignment of cores thereto (702). For example, the workload manager 128 may select the buffer 302 as an initial buffer for assigning cores to related tasks thereof.

Subsequently, all available cores for assignment to the selected buffer may be determined (704). For example, the workload manager 128 may determine that the 3 cores 106A, 106B, 106C are available for assignment.

If the set of available cores were empty (706), then operations would proceed to wait with reference to the selected buffer (702), for assignment of cores thereto once at least one core becomes available. On the other hand, proceeding with the example of available cores 106A, 106B, 106C (706), then operations may proceed with selection of a core from the available cores (708). For example, the workload manager 128 may select the first available core 106A.

Subsequently, the control algorithm of FIG. 5 may be executed to determine whether to add the available cores into a read or write task associated with the selected buffer (710). For example, the workload manager 128 may consult an output of the buffer monitor 122, the threshold manager 124, and the speed controller 126 in order to determine that the core 106A should be assigned to the task 304A of the operator 304.

If not all tasks of the selected buffer have been assigned a maximum number of cores per task (e.g., one) (712), and if the set of cores is not empty (706), then a further core may be selected (708), e.g., the core 106B, and assigned to an appropriate task, e.g., according to the algorithm of FIG. 5 (710). For example, the core 106B may be assigned to the task 304B of the operator 304. Then operations 706-712 may be repeated to assign the core 106C to the task 304C.

Once all tasks of the selected buffer have been assigned a maximum number of cores per task (712), a subsequent buffer, e.g., the buffer 308 may be selected (702) for the process to continue as long as there are available cores.

Algorithm 3

```
1: FUNCTION LEM
2: IN/OUT: Buffer, one buffer of workflow
3: IN: CS, core set for data process
4: BEGIN
5:    while CS is not empty do
6:        Assign(Buffer, 1)
7:        TC(Buffer, TS_r, TS_w)
8:    end while
9:    return
10: END
```

As shown in Algorithm 3, a loop based function may be used in which, in line 2 and 3, (as in Algorithm 2) a Buffer and CS are set as the input. For example, as above, the Buffer may be the lowest buffer of the query workflow which contains data to be processed (or an overall first buffer of the query workflow), and CS is the set of cores available in the system. Lines 5 to 8 describe the condition of function return that occurs when no cores are available for running tasks. In line 6, one core is assigned to current buffer, either as a reading task or writing task, by following a threshold controlling adjustment (e.g., according to Algorithm 1) in line 9. Accordingly, the cores are assigned to the tasks processed on one special buffer. In this mode, the time for task switching may be reduced in order to improve the processing time for the whole workflow, although (as described), a relatively longer time may be needed to return any final query result(s).

The examples of FIGS. 1-7 thus provide techniques for processing a wide variety of data types that may occur. For example, such data types may include OLTP (On-line transaction processing) workloads, as well as OLAP (Online analytic processing) workloads. Depending on a presence of such data types, the examples of FIGS. 1-7 may provide the advantages of, e.g., requiring a relatively low degree of control of a runtime environment of the data processing, supporting data types in which no data partitioning is available or supported, and managing mixed workloads of OLAP and OLTP. Further, the examples of FIGS. 1-7 do no not assume or require availability of data statistics and application semantics for underlying database systems in order to optimize assignment of cores 106.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a computer-readable medium that are executable by at least one processor, the system comprising:
a buffer monitor configured to cause the at least one processor to monitor buffer content of a plurality of buffers being used during processing of a query workflow by a plurality of processing cores in which write tasks of the query workflow write data in parallel to the buffers and read tasks of the query workflow read data in parallel from the buffers, each of the buffers having a buffer capacity, the buffer monitor configured to provide an output describing a current filled level of each buffer;
a threshold manager configured to cause the at least one processor to compare the output of the buffer monitor relative to a plurality of thresholds including comparing the current filled level of the buffer content of each buffer to a low threshold and to a high threshold of the plurality of thresholds that are defined relative to the buffer capacity of each buffer;
based on results of comparing the current filled level of the buffer content of each buffer relative to the low and high thresholds, a speed controller configured to cause the at least one processor to control a number of the write tasks relative to a number of the read tasks that are currently executing the query workflow including switching the plurality of processing cores between the write and read tasks to reallocate processing of the write and read tasks, to thereby maintain the buffer content of each buffer between the low threshold and the high threshold; and
a workload manager configured to cause the at least one processor to associate available processing cores of the plurality of processing cores among the plurality of buffers for parallel processing of the query workflow including associated write and read tasks thereof.

2. The system of claim 1, wherein the buffer monitor is configured to cause the at least one processor to count a number of filled memory blocks relative to a number of empty memory blocks within the buffer.

3. The system of claim 1, wherein the threshold manager includes a threshold comparator configured to cause the at least one processor to determine whether the buffer content is lower than the low threshold or higher than the high threshold.

4. The system of claim 1, wherein the threshold manager includes a threshold adjuster configured to cause the at least one processor to adjust the high and low thresholds relative to a number of the write tasks and/or a number of the read tasks, and relative to a number of empty and/or filled memory blocks of the buffer.

5. The system of claim 1, wherein the speed controller is configured to cause a workload manager to cause the at least one processor to control the number of write tasks relative to the number of read tasks by reassigning processing cores processing the write tasks and the read tasks.

6. The system of claim 5, wherein the speed controller is configured to cause the workload manager to cause the at least one processor to assign processing cores from at least one write task, to thereby deactivate the at least one write task, to at least one read task, to thereby activate the at least one read task, when the buffer content is above the high threshold.

7. The system of claim 5, wherein the speed controller is configured to cause the workload manager to cause the at least one processor to assign processing cores from at least one read task, to thereby deactivate the at least one read task, to at least one write task, to thereby activate the at least one write task, when the buffer content is below the low threshold.

8. The system of claim 1, wherein the workload manager is configured to cause the at least one processor to associate the available processing cores among the plurality of buffers for parallel processing of the query workflow including associated write and read tasks thereof by assigning the available processing cores to concurrently-executing portions of the query workflow.

9. The system of claim 1, wherein the query workflow includes at least one sequence of buffers and wherein the workload manager is configured to cause the at least one processor to implement a pipeline encouraged mode including assigning processing cores from the available processing cores to at least one task associated with each buffer of the at least one sequence of buffers.

10. The system of claim 1, wherein the query workflow includes at least one sequence of buffers and wherein the workload manager is configured to cause the at least one processor to implement a locale encouraged mode including assigning processing cores from the available processing cores to tasks of a first selected buffer of the sequence of buffers until a maximum number of cores is reached for implementing the tasks of the first selected buffer, and then assigning remaining processor cores from the available processing cores to tasks of a second selected buffer of the sequence of buffers.

11. The system of claim 1 wherein the query workflow is expressed as a directed acyclic graph in which the buffer is one of a plurality of buffers and the write task and the read task are included in a plurality of tasks, and wherein the plurality of buffers and the plurality of tasks are nodes of the directed acyclic graph.

12. A method implemented by at least one processor, the method comprising:
  monitoring, using the at least one processor, buffer content of a plurality of buffers being used during processing of a query workflow by a plurality of processing cores in which write tasks of the query workflow write data in parallel to the buffers and read tasks of the query workflow read data in parallel from the buffers, each of the buffers having a buffer capacity, and providing an output describing a current filled level of each buffer;
  comparing, using the at least one processor, the output describing the current filled level of each buffer relative to a plurality of thresholds including comparing the current filled level of the buffer content of each buffer to a low threshold and to a high threshold of the plurality of thresholds that are defined relative to the buffer capacity of each buffer;
  based on results of comparing the current filled level of the buffer content of each buffer relative to the low and high thresholds, controlling, using the at least one processor, a number of the write tasks relative to a number of the read tasks that are currently executing the query workflow including switching the plurality of processing cores between the write and read tasks to reallocate processing of the write and read tasks, to thereby maintain the buffer content of each buffer between the low threshold and the high threshold; and
  associating available processing cores of the plurality of processing cores among the plurality of buffers for parallel processing of the query workflow including associated write and read tasks thereof.

13. The method of claim 12, wherein the comparing including determining whether the buffer content is lower than the low threshold or higher than the high threshold.

14. The method of claim 12, comprising adjusting the high and low thresholds relative to a number of the write tasks and/or a number of the read tasks, and relative to a number of empty and/or filled memory blocks of the buffer.

15. The method of claim 12, the controlling comprising controlling the number of write tasks relative to the number of read tasks by reassigning processing cores processing the write tasks and the read tasks.

16. The method of claim 12, associating available processing cores of the plurality of processing cores among the plurality of buffers for parallel processing of the query workflow including associated write and read tasks thereof by assigning the available processing cores to concurrently-executing portions of the query workflow.

17. A computer program product, the computer program product being tangibly embodied on a non-transitory computer-readable storage medium and comprising instructions that, when executed, are configured to cause at least one processor to:
  monitor buffer content of a plurality of buffers being used during processing of a query workflow by a plurality of processing cores in which write tasks of the query workflow write data in parallel to the buffers and read tasks of the query workflow read data in parallel from the buffers, each of the buffers having a buffer capacity, and provide an output describing a current filled level of each buffer;
  compare the output describing the current filled level of each buffer relative to a plurality of thresholds including comparing the current filled level of the buffer content of each buffer to a low threshold and to a high threshold of the plurality of thresholds that are defined relative to the buffer capacity of each buffer;
  based on results of comparing the current filled level of the buffer content of each buffer relative to the low and high thresholds, control a number of the write tasks relative to a number of the read tasks that are currently executing the query workflow including switching the plurality of processing cores between the write and read tasks to reallocate processing of the write and read tasks, to thereby maintain the buffer content of each buffer between the low threshold and the high threshold; and
  associate available processing cores of the plurality of processing cores among the plurality of buffers for parallel processing of the query workflow including associated write and read tasks thereof.

18. The computer program product of claim 17, wherein the instructions, when executed, cause the at least one processor to compare the buffer content including determining whether the buffer content is lower than the low threshold or higher than the high threshold.

19. The computer program product of claim 17, wherein the instructions, when executed, cause the at least one processor to control the number of write tasks relative to the number of read tasks by reassigning processing cores processing the write tasks and the read tasks.

20. The computer program product of claim 17, wherein the instructions, when executed, further cause the at least one processor to associate available processing cores of the plurality of processing cores among the plurality of buffers for parallel processing of the query workflow including associated write and read tasks thereof by assigning the available processing cores to concurrently-executing portions of the query workflow.

* * * * *